(12) United States Patent
Sugino

(10) Patent No.: US 11,391,399 B2
(45) Date of Patent: Jul. 19, 2022

(54) THREADED CONNECTION FOR STEEL PIPES

(71) Applicants: NIPPON STEEL CORPORATION, Tokyo (JP); VALLOUREC OIL AND GAS FRANCE, Aulnoye-Aymeries (FR)

(72) Inventor: Masaaki Sugino, Tokyo (JP)

(73) Assignees: NIPPON STEEL CORPORATION, Tokyo (JP); VALLOUREC OIL AND GAS FRANCE, Aulnoye-Aymeries (FR)

( * ) Notice: Subject to any disclaimer, the term of this patent is extended or adjusted under 35 U.S.C. 154(b) by 0 days.

(21) Appl. No.: 16/973,123

(22) PCT Filed: Jul. 1, 2019

(86) PCT No.: PCT/JP2019/026013
§ 371 (c)(1),
(2) Date: Dec. 8, 2020

(87) PCT Pub. No.: WO2020/039750
PCT Pub. Date: Feb. 27, 2020

(65) Prior Publication Data
US 2021/0254763 A1    Aug. 19, 2021

(30) Foreign Application Priority Data

Aug. 21, 2018   (JP) .............................. JP2018-154574

(51) Int. Cl.
*F16L 15/00*      (2006.01)
*F16L 15/06*      (2006.01)

(52) U.S. Cl.
CPC ............. *F16L 15/002* (2013.01); *F16L 15/06* (2013.01)

(58) Field of Classification Search
CPC ....... F16L 15/06; F16L 15/001; F16L 15/002; D21B 17/042; E21B 17/042
See application file for complete search history.

(56) References Cited

U.S. PATENT DOCUMENTS 4,508,375 A  *  4/1985  Patterson .............. F16L 15/001
                                                              285/334
5,092,635 A  *  3/1992  DeLange .............. F16L 15/001
                                                              285/332.3

(Continued)

FOREIGN PATENT DOCUMENTS

CN         201574696 U      9/2010
JP          06281059 A      10/1994
(Continued)

*Primary Examiner* — David Bochna
(74) *Attorney, Agent, or Firm* — Greer Burns & Crain Ltd.

(57) ABSTRACT

The disclosed threaded connection for steel pipes includes a pin including a tapered male thread part and a shoulder part, and a box including a tapered female thread part and a shoulder part. In a made up state in which the shoulder parts are in contact with each other, clearances are provided between crests of the male thread part and roots of the female thread part. At a longitudinal section that includes a pipe axis of the threaded connection, the crests of the male thread part are formed in a convex curve that is tangent to both first corner portions which are formed in an arc that connect the crests and load flanks, and second corner portions which are formed in an arc that connect the crests and stabbing flanks. A solid lubricant coating is provided on the surface of the male thread part.

12 Claims, 7 Drawing Sheets

(56) References Cited

U.S. PATENT DOCUMENTS

| | | | | |
|---|---|---|---|---|
| 5,419,595 | A * | 5/1995 | Yamamoto | E21B 17/042 285/334 |
| 5,931,511 | A * | 8/1999 | DeLange | F16L 15/004 285/334 |
| 6,454,315 | B1 * | 9/2002 | Yamaguchi | F16L 15/001 285/334 |
| 7,823,931 | B2 * | 11/2010 | Hamamoto | E21B 17/042 285/334 |
| 2004/0195835 | A1 * | 10/2004 | Noel | F16L 15/06 285/333 |
| 2005/0025631 | A1 | 2/2005 | Lake | |
| 2010/0301600 | A1 | 12/2010 | Goto et al. | |
| 2013/0119657 | A1 * | 5/2013 | Li | E21B 17/042 285/334 |
| 2017/0122468 | A1 * | 5/2017 | Sugino | E21B 17/042 |
| 2019/0211631 | A1 * | 7/2019 | Yamaguchi | F16L 15/06 |

FOREIGN PATENT DOCUMENTS

| | | |
|---|---|---|
| WO | 2007042231 A2 | 4/2007 |
| WO | 2009072486 A1 | 6/2009 |
| WO | 2015182128 A1 | 12/2015 |

\* cited by examiner

FIG.1
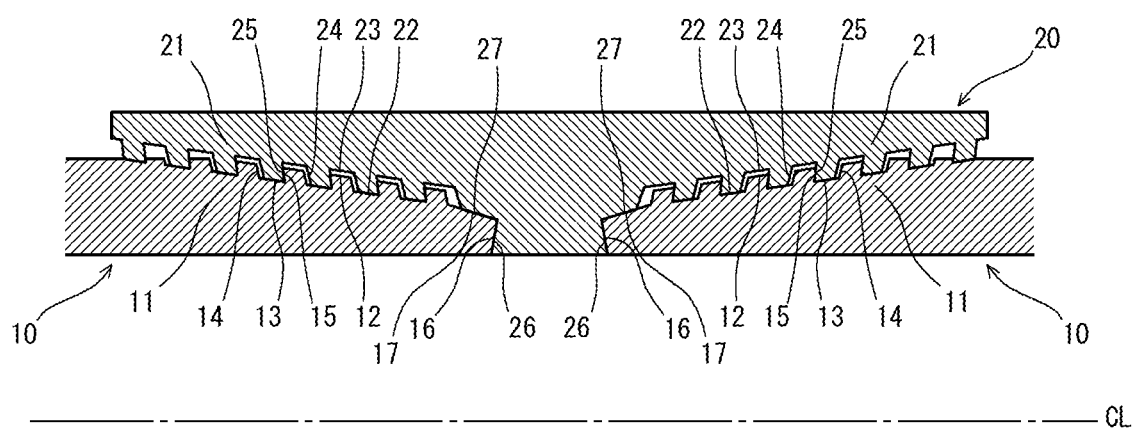
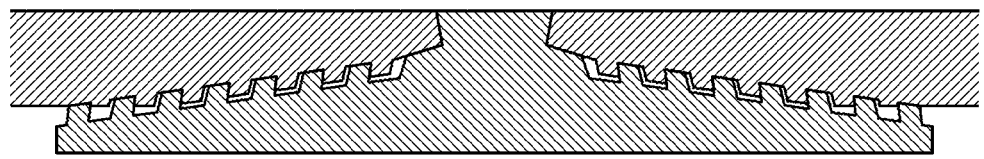

THREADED CONNECTION FOR STEEL PIPES

This is a National Phase Application filed under 35 U.S.C. § 371, of International Application No. PCT/JP2019/026013, filed Jul. 1, 2019, the contents of which are incorporated by reference.

TECHNICAL FIELD

The present invention relates to a threaded connection for use in connecting steel pipes.

BACKGROUND ART

In oil wells, natural gas wells, and the like (hereinafter also collectively referred to as "oil wells"), steel pipes referred to as "Oil Country Tubular Goods (OCTG)" are used for extracting underground resources. The steel pipes are sequentially connected to each other. Threaded connections are used to connect the steel pipes.

Threaded connections for steel pipes are broadly classified into two types: coupling-type threaded connections and integral-type threaded connections. In the case of a coupling-type threaded connection, among a pair of tubes which are objects to be connected to each other, one of the tubes is a steel pipe, and the other of the tubes is a coupling. In this case, male thread parts are formed on the outer circumference at both end portions of the steel pipe, and female thread parts are formed on the inner circumference at both end portions of the coupling. The steel pipe and the coupling are thus connected to each other. In the case of an integral-type threaded connection, a pair of the tubes which are objects to be connected to each other are each a steel pipe, and a separate coupling is not used. In this case, a male thread part is Ruined on the outer circumference at one end portion of each steel pipe, and a female thread part is formed on the inner circumference at the other end portion. Thus, the one steel pipe and the other steel pipe are connected to each other.

A joint portion at a pipe end portion where a male thread part is formed is referred to as a "pin" because it includes an element that is inserted into a female thread part. On the other hand, a joint portion at a pipe end portion where a female thread part is formed is referred to as a "box" because it includes an element that receives a male thread part. These pins and boxes each have a tubular shape because they are end portions of tubular goods.

The thread of a threaded connection for steel pipes (hereunder, also referred to simply as a "threaded connection") is a tapered thread. Therefore, the pin includes a tapered male thread part as a male thread part. As a female thread part, the box includes a tapered female thread part that engages with the tapered male thread part. Further, the thread of a threaded connection is a trapezoidal thread that is typified by a buttress thread according to the API standards. In a trapezoidal thread, a tapered male thread part (hereunder, also referred to simply as a "male thread part") and a tapered female thread part (hereunder, also referred to simply as a "female thread part") each include four surfaces, namely, a crest, a root, a load flank and a stabbing flank, and also include corner portions or fillet portions such as arcs that connect these surfaces. A crest, a root, a load flank and a stabbing flank are clearly distinguished from each other by their shapes and functions.

Normally, a pin and a box each include a shoulder part. The shoulder part of the pin contacts the shoulder part of the box when screwing the pin into the box. When screwing of the pin is continued to rotate the pin by a predetermined amount, make-up of the pin into the box is complete. As a result, a tightening axial force arises, and load flanks of the pin are strongly pressed against load flanks of the box. In a state in which make-up is complete (hereunder, also referred to as a "made up state"), the roots of the male thread part (hereunder, also referred to as "male roots") are in contact with the crests of the female thread part (hereunder, also referred to as "female crests") while interfering with the female crests. On the other hand, a clearance is formed between the crests of the male thread part (hereunder, also referred to as "male crests") and the roots of the female thread part (hereunder, also referred to as "female roots").

In some cases the pin and the box each include a seal surface. In such a case, in a made up state, the seal surface of the pin is in contact with the seal surface of the box while interfering with the seal surface of the box, and a seal portion that seals by metal-to-metal contact is formed.

Conventionally, when screwing a pin into a box to make up the pin and box, a grease compound, which is a lubricant, is applied to the thread parts (male thread part and female thread part). In recent years, in order to address environmental regulations and to improve the efficiency of make-up operations, in place of a grease compound, a solid lubricant coating is formed in advance on the surface of thread parts (for example, see International Application Publication No. WO2007/042231 (Patent Literature 1), and International Application Publication No. WO2009/072486 (Patent Literature 2)).

The solid lubricant coating is originally a semi-solid lubricant with flow properties, and is applied onto the surface of the thread part using a brush, a spray device, or the like. The applied semi-solid lubricant is subjected to a hardening process (for example, cooling or UV irradiation) and solidifies to form a solid lubricant coating.

However, the semi-solid lubricant applied onto the thread part flows during a period from application until solidification. As a result, the coating thickness of the pre-solidified lubricant is non-uniform. Specifically, for example, as disclosed in International Application Publication No. WO2015/182128 (Patent Literature 3), the coating thickness becomes thin at a corner portion that connects a crest and a load flank, and at a corner portion that connects a crest and a stabbing flank. In the crest, the coating thickness becomes particularly thick at a central region. Such a non-uniformity of the coating thickness is maintained after solidification also. Consequently, the coating thickness of the solid lubricant coating becomes non-uniform.

As described above, in a made up state, a clearance is provided between the male crest and the female root. That is, even during make-up, a clearance is provided between the male crest and the female root. In this case, if a solid lubricant coating on the male crest is thick, the solid lubricant coating will delaminate during make-up. The delaminated solid lubricant easily tumbles through the clearance between the male crest and the female root. If the solid lubricant that tumbles through the clearance becomes a large amount, smooth screwing of the pin into the box is inhibited. As a result, make-up trouble arises.

For example, humping arises in a torque chart, or high shouldering occurs. Threaded connections are usually made up with the use of torque management. If humping or high shouldering occurs, high torque is generated regardless of the fact that the state is a state partway through a make-up operation. In such a case, the make-up ends at a time point that is partway through the make-up operation. That is, make-up ends in a state in which tightening is insufficient. Consequently, a state is entered in which a predetermined amount of interference is not introduced to a seal portion and consequently a leak is liable to occur, or a state is entered in which a predetermined tightening axial force is not introduced to a thread and consequently looseness is liable to arise. Therefore, the desired sealing performance and joint strength are not obtained.

With respect to this problem, in a threaded connection disclosed in Patent Literature 3, a shallow groove is provided in a central region of a male crest. A semi-solid lubricant applied onto the male crest spreads in a direction in which the coating thickness becomes thin by means of the groove. Therefore, on the male crest, the coating thickness of the semi-solid lubricant becomes uniform without becoming thick, and the solid lubricant coating also becomes uniform. Therefore, according to the threaded connection of Patent Literature 3, the occurrence of make-up trouble can be suppressed.

CITATION LIST

Patent Literature

Patent Literature 1: International Application Publication No. WO2007/042231
Patent Literature 2: International Application Publication No. WO2009/072486
Patent Literature 3: International Application Publication No. WO2015/182128

SUMMARY OF INVENTION

Technical Problem

In the threaded connection described in Patent Literature 3, in order to provide a groove in the male crest, a special threading tool having a convex shape that corresponds to the groove is used. In such case, there is the inconvenience that the lifetime of the tool is short and the tool must be replaced at frequent intervals. It is also possible to use a dedicated groove processing tool after machining a normal male thread part without grooves. In such case, there is the inconvenience that the total machining time is lengthened. In either case, it is undeniable that there is a drop in productivity with respect to the threaded connection.

An objective of the present invention is to provide a threaded connection for steel pipes that includes a solid lubricant coating on the surface of a male thread part, and that can suppress the occurrence of make-up trouble without a loss in productivity with respect to the threaded connection.

Solution to Problem

A threaded connection for steel pipes according to an embodiment of the present invention includes a tubular pin and a tubular box. The pin includes a tapered male thread part and a shoulder part. The tapered male thread part includes crests, roots, load flanks and stabbing flanks. The box includes a tapered female thread part that engages with the tapered male thread part, and a shoulder part that corresponds to the shoulder part of the pin. The tapered female thread part includes crests, roots, load flanks and stabbing flanks. In a made up state in which the shoulder part of the pin contacts the shoulder part of the box, the roots of the tapered male thread part are in contact with the crests of the tapered female thread part while interfering with the crests of the tapered female thread part, and clearances are provided between the crests of the tapered male thread part and the roots of the tapered female thread part.

At a longitudinal section that includes a pipe axis of the aforementioned threaded connection, the crests of the tapered male thread part are connected to the load flanks of the tapered male thread part through first corner portions being formed in an arc. The crests of the tapered male thread part are connected to the stabbing flanks of the tapered male thread part through second corner portions being formed in an arc. The load flanks and the stabbing flanks of the tapered male thread part each are formed in a straight line. Further, a flank angle of the load flanks of the tapered male thread part is a negative angle. In addition, the crests of the tapered male thread part are formed in a convex curve that is tangent to both the first corner portion and the second corner portion. Further, the aforementioned threaded connection includes a solid lubricant coating on the surface of the tapered male thread part.

Advantageous Effects of Invention

According to the threaded connection for steel pipes according to an embodiment of the present invention, even in a case where a solid lubricant coating is provided on the surface of a male thread part, the occurrence of make-up trouble can be suppressed without a loss in productivity with respect to the threaded connection.

BRIEF DESCRIPTION OF DRAWINGS

FIG. 1 is a longitudinal sectional view illustrating a representative example of a threaded connection for steel pipes according to a first embodiment.

DESCRIPTION OF EMBODIMENTS

Figure 2:
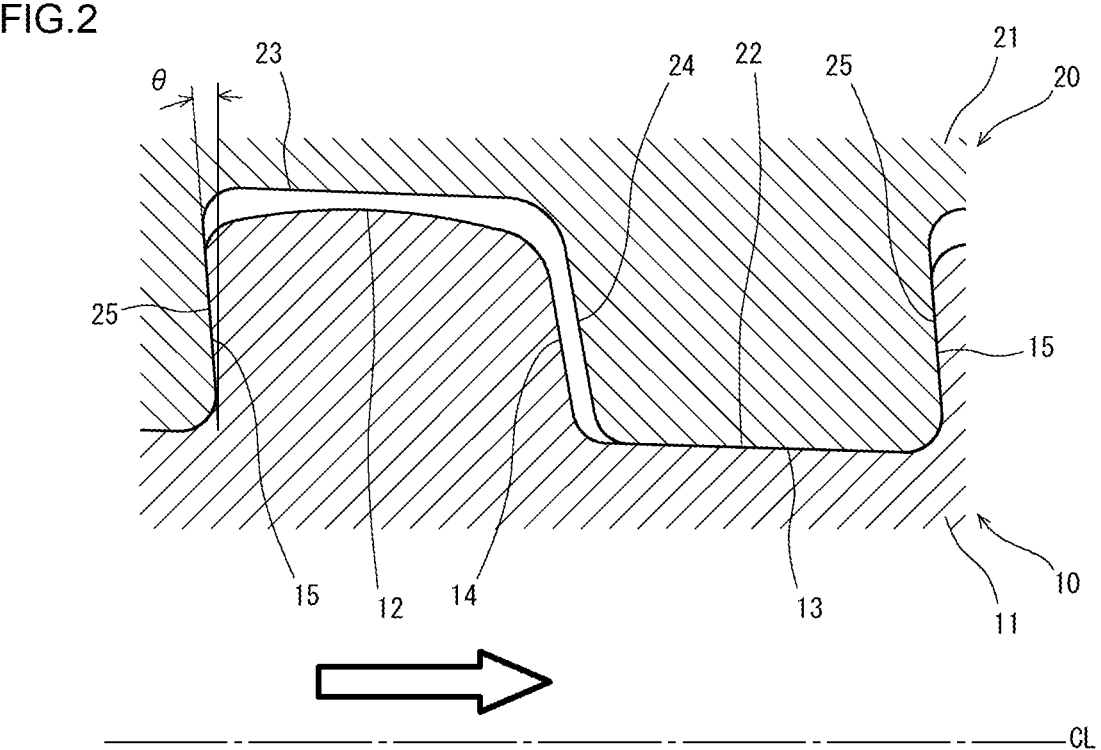
FIG. 2 is a longitudinal sectional view illustrating a region of a thread part of the threaded connection for steel pipes according to the first embodiment in an enlarged manner.

A threaded connection for steel pipes according to an embodiment of the present invention includes a tubular pin and a tubular box. The pin includes a tapered male thread part and a shoulder part. The tapered male thread part includes crests, roots, load flanks and stabbing flanks. The box includes a tapered female thread part that engages with the tapered male thread part, and a shoulder part that corresponds to the shoulder part of the pin. The tapered female thread part includes crests, roots, load flanks and stabbing flanks. In a made up state in which the shoulder part of the pin contacts the shoulder part of the box, the roots of the tapered male thread part are in contact with the crests of the tapered female thread part while interfering with the crests of the tapered female thread part, and clearances are provided between the crests of the tapered male thread part and the roots of the tapered female thread part.

At a longitudinal section that includes a pipe axis of the aforementioned threaded connection, the aforementioned threaded connection includes the following configuration. The crests of the tapered male thread part are connected to the load flanks of the tapered male thread part through first corner portions being formed in an arc. The crests of the tapered male thread part are connected to the stabbing flanks of the tapered male thread part through second corner portions being formed in an arc. The load flanks and the stabbing flanks of the tapered male thread part each are formed in a straight line. A flank angle of the load flanks of the tapered male thread part is a negative angle. The crests of the tapered male thread part are formed in a convex curve that is tangent to both the first corner portion and the second corner portion. Further, the aforementioned threaded connection includes a solid lubricant coating on the surface of the tapered male thread part.

According to the threaded connection of the present embodiment, the whole of the male crest gradually rises. That is, the male crest is not flat, and a groove is not provided in the male crest. Surface tension acts on the semi-solid lubricant that is applied to the respective male crests. Normally, surface tension works in a direction that minimizes the surface energy of an object, and imparts a driving force that minimizes the area of the free surface of a liquid at a gas-liquid interface. Consequently, a semi-solid lubricant that is applied at a place with a small radius of curvature flows to a place with a larger radius of curvature. The greater a difference in the radius of curvature is between adjacent surfaces, the more noticeable the aforementioned flow becomes.

In the conventional trapezoidal thread, since the radius of curvature of a flat crest is infinite, a difference in the radius of curvature between the crest and a corner portion is extremely large. Consequently, a non-uniformity in the coating thickness has been large due to a noticeable flow of the semi-solid lubricant. In the threaded connection of the present embodiment, because the entire male crest gradually rises, a difference in the radius of curvature between the crest and the corner portion is quite small in comparison to the conventional trapezoidal thread. Therefore, the occurrence of an inadvertent flow of the semi-solid lubricant is also suppressed. By this means, on the male crest, the coating thickness of the semi-solid lubricant becomes uniform without becoming thick, and the coating thickness of the solid lubricant coating also becomes uniform. Accordingly, the occurrence of make-up trouble can be suppressed. As a result, the desired sealing performance and joint strength are obtained.

A threading tool for forming the male thread part has a concave shape corresponding to the crest that rises gradually. During thread machining, the load that the concave-shaped portion receives is far smaller than the load that the convex-shaped portion receives. Therefore, the lifetime of the tool does not become particularly short. Accordingly, there is no loss in productivity with respect to the threaded connection.

Flat load flanks and flat stabbing flanks are present in the threaded connection of the present embodiment. In addition, the flank angle of the load flanks is a negative angle. That is, the load flank inclines in a hook shape. Therefore, a tightening axial force effectively acts on the load flank. By this means, even if a tensile load acts, it is difficult for jump-out to occur. Therefore, the joint has high strength.

The solid lubricant coating that is used in the threaded connection of the present embodiment is not particularly limited as long as the solid lubricant coating has fluidity during application and is subjected to a hardening process after application and solidifies. That is, solid lubricant coatings that do not flow before solidification, such as an electrodeposited coating or a pressure-bonded coating are not included in the solid lubricant coatings that may be used in the present embodiment.

In the threaded connection of the present embodiment, the shape of the female roots is not limited as long as a clearance is formed between the male crests and the female roots in a made up state. For example, at a longitudinal section of the threaded connection, the female root is formed in a straight line. In this case, the entire female root is flat. Further, at a longitudinal section of the threaded connection, the female root may be formed in a concave curve shape so as to correspond to the male crest. In this case, the entire female root is gradually recessed.

In a typical example, the pin and box each include a seal surface. In this case, in a made up state, the seal surface of the pin comes in contact with the seal surface of the box while interfering with the seal surface of the box, and a seal portion that seals by metal-to-metal contact is formed. However, seal surfaces need not be provided.

The aforementioned threaded connection preferably includes the following configuration. At a longitudinal section of the threaded connection, when an imaginary first circle including an arc forming the first corner portion, an imaginary second circle including an arc forming the second corner portion, and an imaginary straight line that is adjacent to the crest of the tapered male thread part and is tangent to both of the imaginary first circle and the imaginary second circle are drawn, a maximum distance b among distances in a direction perpendicular to the pipe axis between the imaginary straight line and a curve forming the crest of the tapered male thread part is between 0.1 mm and 0.3 mm. If the maximum distance b is 0.1 mm or more, coating thickness of the solid lubricant coating becomes effectively uniform. Preferably, the maximum distance b is 0.2 mm or more. On the other hand, if the maximum distance b is not more than 0.3 mm, a height of the load flank in a direction perpendicular to the pipe axis is effectively secured, and there is no adverse effect on the joint strength.

In a typical example, at a longitudinal section of the threaded connection, the curve forming the crest of the tapered male thread part is an arc, an elliptical arc or a parabola.

The aforementioned threaded connection preferably includes the following configuration. At a longitudinal section of the threaded connection, a height LSH in a direction perpendicular to the pipe axis of the load flank (hereunder, also referred to as a "load flank height") of the tapered male thread part is 30% or more to 70% or less of a thread height H of the tapered male thread part. In addition, a height SSH in a direction perpendicular to the pipe axis of the stabbing flank (hereunder, also referred to as a "stabbing flank height") of the tapered male thread part is 30% or more to 70% or less of the thread height H of the tapered male thread part.

If the load flank height LSH is 30% or more of the thread height H, there is no adverse effect on the joint strength. Preferably, the load flank height LSH is 40% or more of the thread height H. On the other hand, if the load flank height LSH is 70% or less of the thread height H, an arc of a sufficient size can be used for a corner portion and a fillet portion that are described later. In this case, the corner portion does not damage the surface of a counterpart member during make-up, and galling resistance is not affected. In addition, there is no hindrance with respect to securing the maximum distance b. Further, in this case, excessive stress concentration at a fillet portion can be avoided, and there are no adverse effects on fatigue strength or the like.

Further, if the stabbing flank height SSH is 30% or more of the thread height H, there is no adverse effect on the compressive strength of the joint. Preferably, the stabbing flank height SSH is 40% or more of the thread height H. On the other hand, if the stabbing flank height SSH is 70% or less of the thread height H, an arc of a sufficient size can be used for the corner portion and the fillet portion that are described later. In this case, the corner portion does not damage the surface of the counterpart member during make-up, and galling resistance is not affected. In addition, there is no hindrance with respect to securing the maximum distance b. Further, in this case, excessive stress concentration at the fillet portion can be avoided, and there are no adverse effects on fatigue strength or the like.

The threaded connection in this case preferably includes the following configuration. At a longitudinal section of the threaded connection, the roots of the tapered male thread part are connected to the load flanks of the tapered male thread part through first fillet portions which are formed in an arc. Further, the roots of the tapered male thread part are connected to the stabbing flanks of the tapered male thread part through second fillet portions which are formed in an arc. In addition, a radius R1 of the first corner portion is 5% or more to 35% or less of the thread height H. Further, a radius R2 of the second corner portion is 15% or more to 50% or less of the thread height H. Furthermore, a radius R3 of the first fillet portion is 15% or more to 50% or less of the thread height H. In addition, a radius R4 of the second fillet portion is 5% or more to 35% or less of the thread height H.

Values that are appropriate with regard to the design are set for the radii R1, R2, R3 and R4 of the first corner portion, the second corner portion, the first fillet portion and the second fillet portion, respectively. In particular, the radius R2 of the second corner portion and the radius R3 of the first fillet portion are set based on the following design concept. In a case where the radius R2 of the second corner portion is overly small, stabbing performance is inhibited. Here, the term "stabbing performance" refers to the performance with regard to, when inserting the pin into the box, how quickly a state is entered in which the male thread part fits securely into the female thread part and rotation of the pin can be started. In addition, in this case, the surface of the female thread part is damaged when inserting the pin into the box, and the galling resistance performance decreases. Therefore, the radius R2 is set to a large value within a range that is allowable under the design circumstances. In a case where the radius R3 of the first fillet portion is overly small, excessive stress concentration will occur during make-up or when a tensile load is applied, and the fatigue resistance performance will decrease. Therefore, the radius R3 is set to a large value within a range that is allowable under the design circumstances. Circumstances such as those that apply to the radius R2 and the radius R3 do not apply to the radius R1 of the first corner portion and the radius R4 of the second fillet portion. Therefore, the radius R1 and the radius R4 are set so that the aforementioned load flank height LSH and stabbing flank height SSH can be secured.

Specific examples of the threaded connection for steel pipes of the present embodiment are described hereunder while referring to the accompanying drawings.

First Embodiment

Figure 3:
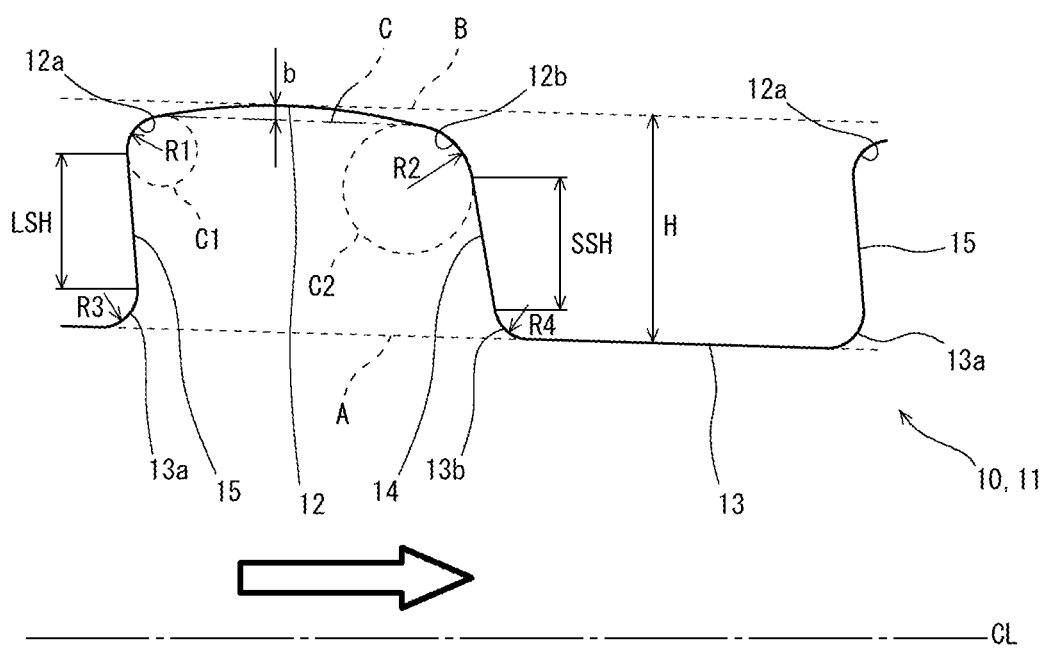
FIG. 3 is a longitudinal sectional view illustrating a state before a solid lubricant coating of a male thread part illustrated in FIG. 2 is formed.
Figure 4:
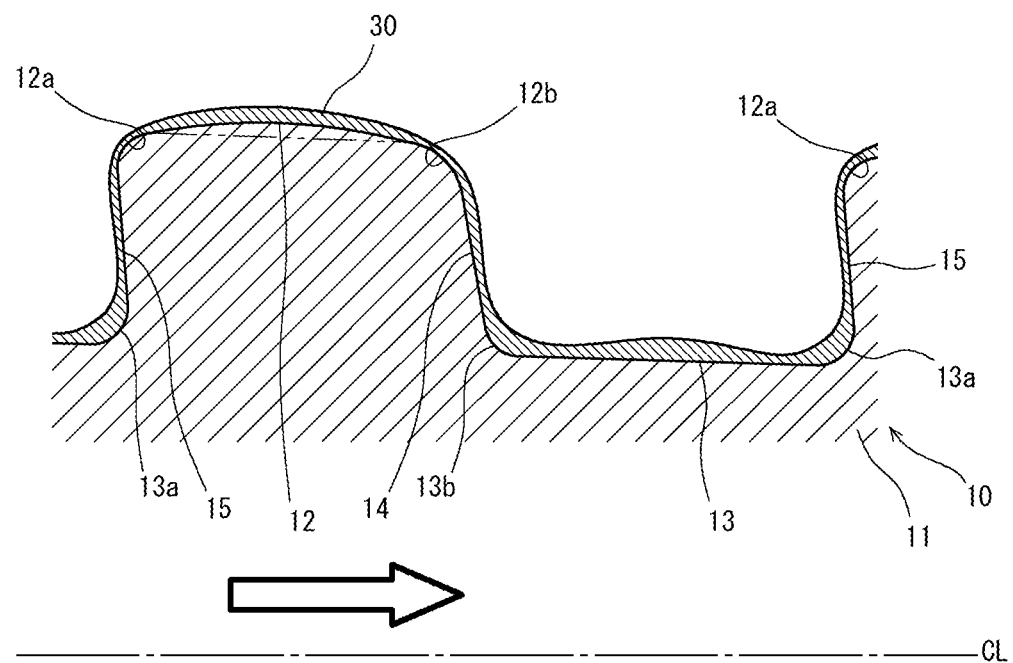
FIG. 4 is a longitudinal sectional view of the male thread part illustrated in FIG. 2.

FIG. 1 is a longitudinal sectional view illustrating a representative example of a threaded connection for steel pipes according to a first embodiment. FIG. 2 is a longitudinal sectional view illustrating a region of a thread part of the threaded connection for steel pipes according to the first embodiment in an enlarged manner. FIG. 3 and FIG. 4 are longitudinal sectional views illustrating a male thread part illustrated in FIG. 2. In FIG. 3, a state before a solid lubricant coating is foliated is illustrated. In FIG. 4, a state in which a solid lubricant coating has been formed is illustrated. In FIG. 2 to FIG. 4, a direction in which the screwing of a pin 10 into a box 20 advances is indicated by an outlined arrow. In the present description, the term "longitudinal section" means a cross section that includes a pipe axis CL of the threaded connection. Note that, in FIG. 1 and FIG. 2, diagrammatic representation of the solid lubricant coating is omitted.

The threaded connection illustrated in FIG. 1 is a coupling-type threaded connection. Referring to FIG. 1, the threaded connection is constituted by a pin 10 and a box 20. The thread of the threaded connection is a tapered thread. The pin 10 includes a male thread part 11 and a shoulder part 16. The shoulder part 16 is provided at the tip of the pin 10. The box 20 includes a female thread part 21 that corresponds to the male thread part 11 of the pin 10, and a shoulder part 26 that corresponds to the shoulder part 16 of the pin 10. The pin 10 also includes a seal surface 17. The seal surface 17 is provided between the male thread part 11 and the shoulder part 16. The box 20 includes a seal surface 27 that corresponds to the seal surface 17 of the pin 10.

Referring to FIG. 1 and FIG. 2, the male thread part 11 of the pin 10 includes crests 12, roots 13, load flanks 15 and stabbing flanks 14. On the other hand, the female thread part 21 of the box 20 includes crests 22, roots 23, load flanks 25 and stabbing flanks 24.

The male crests 12 face the female roots 23. As described in detail later, at a longitudinal section of the threaded connection, each male crest 12 is formed in a convex curve. That is, the male crests 12 gradually rise. At a longitudinal section of the threaded connection, each female root 23 is formed in a straight line. That is, the female roots 23 are flat.

The male roots 13 face the female crests 22. At a longitudinal section of the threaded connection, each male root 13 is formed in a straight line. That is, the male roots 13 are flat. At a longitudinal section of the threaded connection, each female crest 22 is formed in a straight line. That is, the female crests 22 are flat.

In the first embodiment, at a longitudinal section of the threaded connection, the male roots 13 are on the same straight line over the entire area in the longitudinal direction (pipe axis CL direction) of the male thread part 11. The female crests 22 are also on the same straight line over the entire area in the longitudinal direction of the female thread part 21. The female roots 23 are also on the same straight line over the entire area in the longitudinal direction of the female thread part 21. These straight lines are inclined at a predetermined taper angle from the pipe axis CL.

The stabbing flanks 14 of the male thread part 11 face the stabbing flanks 24 of the female thread part 21. At a longitudinal section of the threaded connection, each stabbing flank 14 of the male thread part 11 is formed in a straight line. That is, the stabbing flanks 14 of the male thread part 11 are flat. At a longitudinal section of the threaded connection, each stabbing flank 24 of the female thread part 21 is formed in a straight line. That is, the stabbing flanks 24 of the female thread part 21 are flat.

The load flanks 15 of the male thread part 11 face the load flanks 25 of the female thread part 21. At a longitudinal section of the threaded connection, each load flank 15 of the male thread part 11 is formed in a straight line. That is, the load flanks 15 of the male thread part 11 are flat. At a longitudinal section of the threaded connection, each load flank 25 of the female thread part 21 is formed in a straight line. That is, the load flanks 25 of the female thread part 21 are flat. A flank angle θ of the load flanks 15 and 25 is a negative angle. That is, the load flanks 15 and 25 incline in a hook shape.

The male thread part 11 engages with the female thread part 21 when the pin 10 is screwed into the box 20. The shoulder part 16 of the pin 10 comes in contact with the shoulder part 26 of the box 20 (see FIG. 1). In a made up state, a tightening axial force is generated by the shoulder parts 16 and 26, and the load flanks 15 of the pin 10 are strongly pressed against the load flanks 25 of the box 20. In addition, the male roots 13 come in contact with the female crests 22 while interfering with the female crests 22. On the other hand, a clearance is provided between the male crests 12 and the female roots 23. A clearance is provided between the stabbing flanks 14 of the male thread part 11 and the stabbing flanks 24 of the female thread part 21. Further, the seal surface 17 of the pin 10 comes in contact with the seal surface 27 of the box 20 while interfering with the seal surface 27, and a seal portion that seals by metal-to-metal contact is thus formed (see FIG. 1).

Referring to FIG. 3 and FIG. 4, at a longitudinal section of the threaded connection, the male crest 12 is connected to the load flank 15 of the male thread part 11 through a first corner portion 12a. The first corner portion 12a is formed in an arc having a radius R1. The male crest 12 is connected to the stabbing flank 14 of the male thread part 11 through a second corner portion 12b. The second corner portion 12b is formed in an arc having a radius R2. The male root 13 is connected to the load flank 15 of the male thread part 11 through a first fillet portion 13a. The first fillet portion 13a is formed in an arc having a radius R3. The male root 13 is connected to the stabbing flank 14 of the male thread part 11 through a second fillet portion 13b. The second fillet portion 13b is formed in an arc having a radius R4.

The radius R1 of the first corner portion 12a is 5% or more to 35% or less of the thread height H. The radius R2 of the second corner portion 12b is 15% or more to 50% or less of the thread height H. The radius R3 of the first fillet portion 13a is 15% or more to 50% or less of the thread height H. The radius R4 of the second fillet portion 13b is 5% or more to 35% or less of the thread height H.

In addition, a height LSH in a direction perpendicular to the pipe axis CL of the load flank 15 of the male thread part 11 is 30% or more to 70% or less of the thread height H of the male thread part 11. A height SSH in a direction perpendicular to the pipe axis CL of the stabbing flank 14 of the male thread part 11 is 30% or more to 70% or less of the thread height H of the male thread part 11. Here, the term "load flank height LSH" can be replaced by the phrase "height (distance) in a radial direction when the load flank 15 is projected onto a face that is perpendicular to the pipe axis CL". The term "stabbing flank height SSH" can be replaced by the phrase "height (distance) in the radial direction when the stabbing flank 14 is projected onto a face that is perpendicular to the pipe axis CL".

At a longitudinal section of the threaded connection, each male crest 12 is formed in a convex curve. The curve is tangent to both of an imaginary first circle C1 that includes the arc having the radius R1 forming the first corner portion 12a, and an imaginary second circle C2 that includes the arc having the radius R2 forming the second corner portion 12b. In FIG. 3 and FIG. 4, an example in which the curve forming the crest 12 is an arc is illustrated. Specifically, referring to FIG. 3, the imaginary first circle C 1 is drawn that includes the arc forming the first corner portion 12a. The imaginary second circle C2 is drawn that includes the arc forming the second corner portion 12b. Further, an imaginary straight line C is drawn that is adjacent to the male crest 12 and contacts both of the imaginary first circle C1 and the imaginary second circle C2. At this time, a maximum distance b among distances in the direction perpendicular to the pipe axis CL between the imaginary straight line C and the curve forming the male crest 12 is between 0.1 mm and 0.3 mm.

For example, in the design stage, the thread height H in the male thread part 11 is defined. In the case of the first embodiment, the male root 13 is on a line A that is inclined at a predetermined taper angle from the pipe axis CL. The line A is parallelly shifted by an amount corresponding to the thread height H in a direction away from the pipe axis CL. The convex male crest 12 contacts a line B that is obtained by parallelly shifting the line A. The line B is parallelly shifted by an amount corresponding to a predetermined distance (maximum distance b) in a direction toward the pipe axis CL. A line C obtained by parallelly shifting the line B is the aforementioned imaginary straight line. In the case of the first embodiment, the imaginary straight line C is inclined at a predetermined taper angle from the pipe axis CL. A circle C1 that contacts both of the straight line C and the load flank 15 is the aforementioned imaginary first circle. A circle C2 that contacts both of the straight line C and the stabbing flank 14 is the aforementioned imaginary second circle. Further, the crest 12 is defined so as to contact the line B and to be tangent to both of the first circle C1 and the second circle C2. In addition, an arc of the first circle C1 which connects the load flank 15 and the crest 12 serves as the first corner portion 12a. An arc of the second circle C2 which connects the stabbing flank 14 and the crest 12 serves as the second corner portion 12b.

Referring to FIG. 4, a solid lubricant coating 30 is formed on the surface of the male thread part 11 of the pin 10. The solid lubricant coating 30 is a substance that has fluidity during application, and is subjected to a hardening process after application and solidifies. Prior to solidification of the solid lubricant coating 30, the occurrence of an inadvertent flow of the semi-solid lubricant that was applied onto the male crests 12 is suppressed. This is because the entire male crest 12 gradually rises and is not flat, and because surface tension acts on the semi-solid lubricant. Therefore, at the male crest 12, the coating thickness of the semi-solid lubricant becomes uniform without becoming thick, and thus the coating thickness of the solid lubricant coating 30 also becomes uniform.

Second Embodiment

Figure 5:
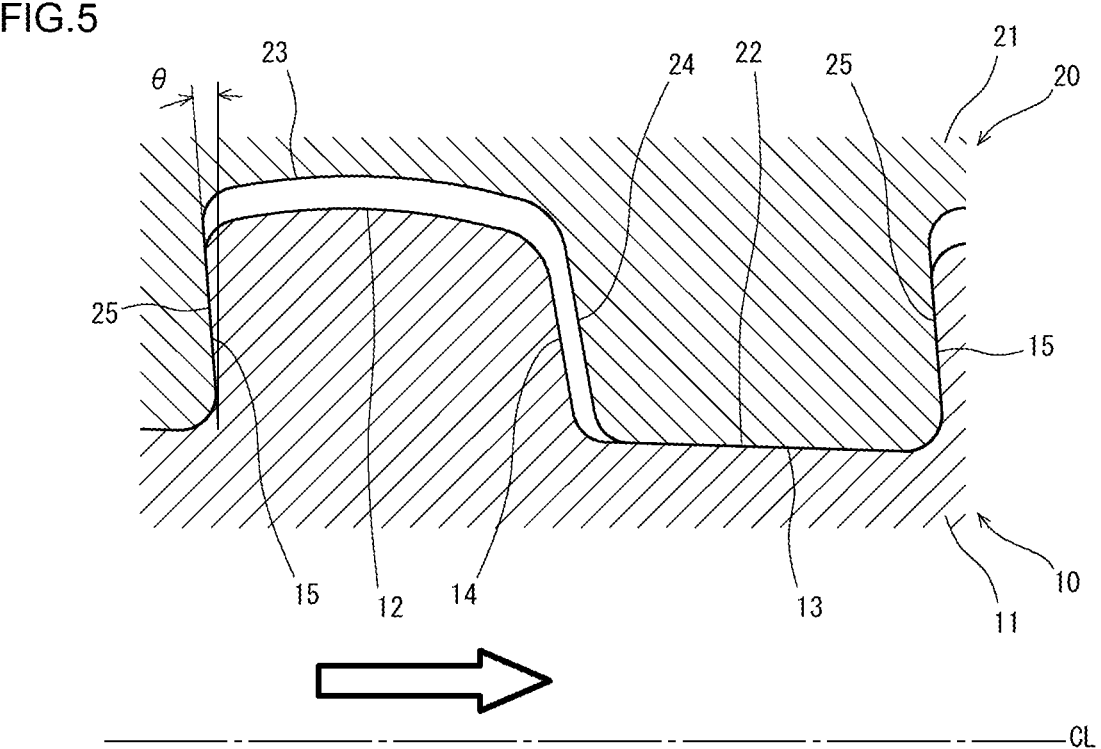
FIG. 5 is a longitudinal sectional view illustrating, in an enlarged manner, a region of a thread part of a threaded connection for steel pipes according to a second embodiment.

FIG. 5 is a longitudinal sectional view illustrating, in an enlarged manner, a region of a thread part of a threaded connection for steel pipes according to a second embodiment. The threaded connection of the second embodiment is a variation of the threaded connection of the first embodiment that is described above. Hereunder, a description regarding a configuration that duplicates the configuration in the threaded connection of the first embodiment will be omitted. The same applies with respect to a third embodiment that is described later.

Referring to FIG. 5, at a longitudinal section of the threaded connection, the female root 23 is formed in a concave curve so as to correspond to the male crest 12. That is, the female root 23 is gradually recessed. In a case of this configuration also, the same advantageous effects as those of the first embodiment are obtained.

Third Embodiment

Figure 6:
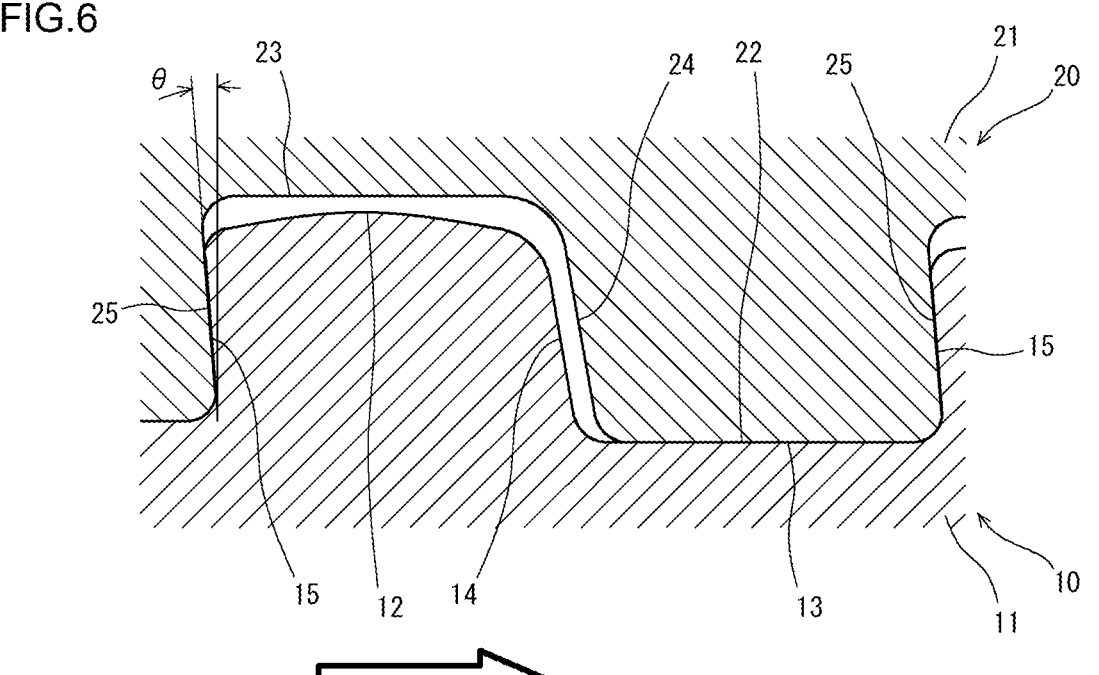
FIG. 6 is a longitudinal sectional view illustrating, in an enlarged manner, a region of a thread part of a threaded connection for steel pipes according to a third embodiment.
Figure 7:
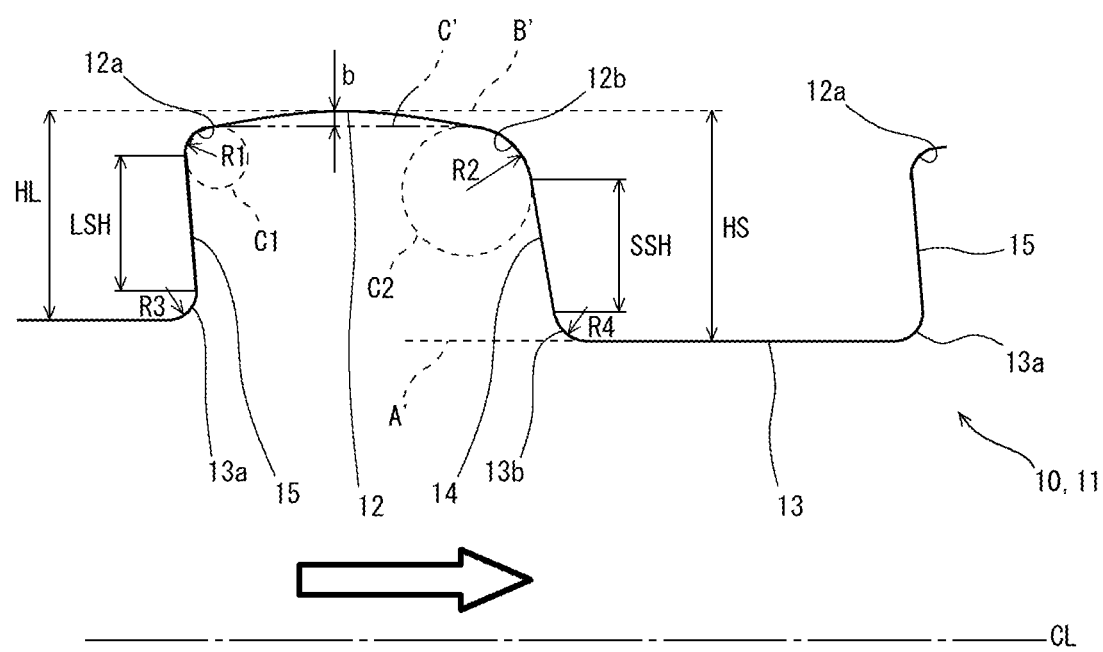
FIG. 7 is a longitudinal sectional view illustrating a state before a solid lubricant coating of a male thread part illustrated in FIG. 6 is formed.

FIG. 6 is a longitudinal sectional view illustrating, in an enlarged manner, a region of a thread part of a threaded connection for steel pipes according to a third embodiment. FIG. 7 is a longitudinal sectional view illustrating a state before a solid lubricant coating of a male thread part illustrated in FIG. 6 is formed.

Referring to FIG. 6 and FIG. 7, at a longitudinal section of the threaded connection, the male crest 12 is formed in a concave curve. The male root 13, the female crest 22 and the female root 23 are formed in a straight line, respectively. However, in the third embodiment, at a longitudinal section of the threaded connection, the male root 13 is parallel to the pipe axis CL. The female crest 22 is also parallel to the pipe axis CL. The female root 23 is also parallel to the pipe axis CL.

For example, a thread height HS on a stabbing flank 14 side and a thread height HL on a load flank 15 side in the male thread part 11 are defined in the design stage. In a case of the third embodiment, the male thread part 11 is designed based on the thread height HS on the stabbing flank 14 side. The male root 13 is on a line A' that is parallel to the pipe axis CL. The line A' is parallelly shifted by an amount corresponding to the thread height HS on the stabbing flank 14 side in a direction away from the pipe axis CL. The convex male crest 12 contacts a line B' obtained by parallelly shifting the line A'. The line B' is parallelly shifted by an amount corresponding to a predetermined distance (maximum distance b) in a direction toward the pipe axis CL. A line C' obtained by parallelly shifting the line B' is the aforementioned imaginary straight line. In the case of the third embodiment, the imaginary straight line C' is parallel to the pipe axis CL. A circle C1 that contacts both of the straight line C' and the load flank 15 is the aforementioned imaginary first circle. A circle C2 that contacts both of the straight line C' and the stabbing flank 14 is the aforementioned imaginary second circle. Further, the crest 12 is defined so as to contact the line B' and to be tangent to both of the first circle C1 and the second circle C2. In addition, an arc of the first circle C1 which connects the load flank 15 and the crest 12 serves as the first corner portion 12a. An arc of the second circle C2 which connects the stabbing flank 14 and the crest 12 serves as the second corner portion 12b.

In the case of this configuration also, the same advantageous effects as those of the first embodiment are obtained. Note that, at a longitudinal section of the threaded connection, the female roots 23 may be formed as concave curves so as to correspond to the male crests 12 as in the second embodiment.

EXAMPLES

To verify the advantages of the present embodiment, numerical simulation and analysis was carried out using a finite element method, and investigation was made into the coating thickness of a semi-solid lubricant applied to a male thread part.

[Test Conditions]

For FEM analysis, models of male thread parts of the first embodiment illustrated in FIG. 3 in which a thread height H was varied were used. The model of Test No. 1 was a comparative example, in which the longitudinal sectional shape of the male crest was a straight line. Test Nos. 2 and 3 are examples 1 and 2, respectively, in which the longitudinal sectional shape of the male crest was a simple arc. The common conditions are as described hereunder.

Thread pitch: 5 TPI (five threads per inch);

Thread width: 2.48 mm along the pitch line;

Thread taper: 6.25% (taper angle: about 1.8°);

Flank angle of load flank: −3°

Flank angle of stabbing flank: 10°

Load flank height LSH: 0.82 mm

Stabbing flank height SSH: 0.86 mm

Radius R1 of first corner portion: 0.35 mm

Radius R2 of second corner portion: 0.76 mm

Radius R3 of first fillet portion: 0.35 mm

Radius R4 of second fillet portion: 0.15 mm

In the FEM analysis, models in which a male thread part and a pre-solidified lubricant were modeled with plane strain elements were used. The male thread part was modeled as an elastic body with a Young's modulus of 210 GPa. The pre-solidified lubricant was modeled as a viscoplastic fluid having fluidity. Specifically, with regard to the pre-solidified lubricant, the viscosity coefficient was 200 centistokes, the mass density was $1.0 \times 10^{-6}$ kg/mm$^3$, and the surface tension was 22 m (milli-) N/m. In all the tests, No. 1 to No. 3, the same amount of viscoplastic fluid was applied using a spray device, and a uniform initial coating thickness was given. The initial coating thickness was 0.1 mm. From this state, analysis of a flow due to surface tension and viscosity was performed, and the coating thickness after the passage of 100 seconds at which time, in practice, the flow had almost stopped was investigated. Note that the lower limit of the coating thickness for ensuring that galling did not occur at the first corner portion and second corner portion connected to the male crest was taken as 0.012 mm.

[Evaluation Method]

The maximum coating thickness on the male crests was sampled. In addition, the minimum coating thickness on the first corner portions and second corner portions was sampled. The ratio (hereunder, also referred to as "coating thickness ratio") of the maximum coating thickness on the male crests to the minimum coating thickness on the two corner portions was then calculated, and the uniformity of the coating thickness was evaluated. The smaller the value for the coating thickness ratio was, the greater the degree of uniformity of the coating thickness indicated thereby. The results are summarized in Table 1 below.

TABLE 1

| No. | Thread Height H [mm] | Maximum Distance b [mm] | Maximum Coating Thickness of Crests [mm] | Minimum Coating Thickness of Corner Portions [mm] | Coating Thickness Ratio [—] | Classification |
|---|---|---|---|---|---|---|
| 1 | 1.58 | 0.0 | 0.149 | 0.014 | 10.30 | Comparative Example |
| 2 | 1.78 | 0.1 | 0.127 | 0.022 | 5.78 | Example 1 |
| 3 | 1.98 | 0.2 | 0.111 | 0.032 | 3.51 | Example 2 |

[Test Results]

The results shown in Table 1 indicate the following. The coating thickness ratios in examples 1 and 2 were smaller than the coating thickness ratio in the comparative example. Accordingly, the coating thickness of the solid lubricant was made uniform by the threaded connections of examples 1 and 2. Further, the minimum coating thickness at the corner portions of the comparative example was equal to the coating thickness lower limit for ensuring that galling does not occur. In contrast, the minimum coating thickness at the corner portions of examples 1 and 2 had an additional margin relative to the coating thickness lower limit. This means that the amount of lubricant applied in examples 1 and 2 can be reduced.

The present invention is not limited to the embodiments described above, and various changes can be made within a range that does not depart from the gist of the present invention. For example, the type of the threaded connection may be either of a coupling type and an integral type. The location and number and the like of the shoulder part is not particularly limited. In a case where a seal portion that seals by metal-to-metal contact is to be provided, the location of the seal portion and the number and the like thereof are not limited.

INDUSTRIAL APPLICABILITY

The threaded connection of the present invention can be effectively utilized to connect steel pipes which are used as oil country tubular goods (OCTG).

REFERENCE SIGNS LIST

10: pin,
11: male thread part,
12: crest,
12a: first corner portion,
12b: second corner portion,
13: root,
13a: first fillet portion,
14b: second fillet portion,
14: stabbing flank,
15: load flank.
16: shoulder part,
17: seal surface,
20: box,
21: female thread part,
22: crest,
23: root,
24: stabbing flank,
25: load flank,
26: shoulder part,
27: seal surface,
30: solid lubricant coating,
CL: pipe axis.

The invention claimed is:

1. A threaded connection for steel pipes comprising a tubular pin and a tubular box, wherein:
the pin includes a tapered male thread part and a shoulder part;
the tapered male thread part includes crests, roots, load flanks and stabbing flanks;
the box includes a tapered female thread part that engages with the tapered male thread part, and a shoulder part that corresponds to the shoulder part of the pin;
the tapered female thread part includes crests, roots, load flanks and stabbing flanks;
in a made up state in which the shoulder part of the pin contacts the shoulder part of the box, the roots of the tapered male thread part are in contact with the crests of the tapered female thread part while interfering with the crests of the tapered female thread part, and clearances are provided between the crests of the tapered male thread part and the roots of the tapered female thread part; and
at a longitudinal section including a pipe axis of the threaded connection,
the crests of the tapered male thread part are connected to the load flanks of the tapered male thread part through first corner portions being formed in an arc,
the crests of the tapered male thread part are connected to the stabbing flanks of the tapered male thread part through second corner portions being formed in an arc,
the load flanks and the stabbing flanks of the tapered male thread part each are formed in a straight line,
a flank angle of the load flanks of the tapered male thread part is a negative angle, and
the crests of the tapered male thread part are formed in a convex curve that is tangent to both of the first corner portion and the second corner portion; and
the threaded connection for steel pipes comprises a solid lubricant coating on a surface of the tapered male thread part.

2. The threaded connection for steel pipes according to claim 1, wherein:
at the longitudinal section, when an imaginary first circle including an arc forming the first corner portion, an imaginary second circle including an arc forming the second corner portion, and an imaginary straight line that is adjacent to the crest of the tapered male thread part and is tangent to both of the imaginary first circle and the imaginary second circle are drawn, a maximum distance among distances in a direction perpendicular to the pipe axis between the imaginary straight line and the curve forming the crest of the tapered male thread part is between 0.1 mm and 0.3 mm.

3. The threaded connection for steel pipes according to claim 2, wherein:
at the longitudinal section, the curve forming the crest of the tapered male thread part is an arc, an elliptical arc or a parabola.

4. The threaded connection for steel pipes according to claim 3, wherein:
at the longitudinal section,
a height in a direction perpendicular to the pipe axis of the load flank of the tapered male thread part is 30% or more to 70% or less of a height of threads of the tapered male thread part, and
a height in a direction perpendicular to the pipe axis of the stabbing flank of the tapered male thread part is 30% or more to 70% or less of the height of the threads of the tapered male thread part.

5. The threaded connection for steel pipes according to claim 4, wherein:
at the longitudinal section,
the roots of the tapered male thread part are connected to the load flanks of the tapered male thread part through first fillet portions being formed in an arc,
the roots of the tapered male thread part are connected to the stabbing flanks of the tapered male thread part through second fillet portions being formed in an arc,
a radius of the first corner portion is 5% or more to 35% or less of the height of the threads,
a radius of the second corner portion is 15% or more to 50% or less of the height of the threads,
a radius of the first fillet portion is 15% or more to 50% or less of the height of the threads, and
a radius of the second fillet portion is 5% or more to 35% or less of the height of the threads.

6. The threaded connection for steel pipes according to claim 2, wherein:
at the longitudinal section,
a height in a direction perpendicular to the pipe axis of the load flank of the tapered male thread part is 30% or more to 70% or less of a height of threads of the tapered male thread part, and
a height in a direction perpendicular to the pipe axis of the stabbing flank of the tapered male thread part is 30% or more to 70% or less of the height of the threads of the tapered male thread part.

7. The threaded connection for steel pipes according to claim 6, wherein:
at the longitudinal section,
the roots of the tapered male thread part are connected to the load flanks of the tapered male thread part through first fillet portions being formed in an arc,
the roots of the tapered male thread part are connected to the stabbing flanks of the tapered male thread part through second fillet portions being formed in an arc,
a radius of the first corner portion is 5% or more to 35% or less of the height of the threads,
a radius of the second corner portion is 15% or more to 50% or less of the height of the threads,
a radius of the first fillet portion is 15% or more to 50% or less of the height of the threads, and
a radius of the second fillet portion is 5% or more to 35% or less of the height of the threads.

8. The threaded connection for steel pipes according to claim 1, wherein:
at the longitudinal section, the curve forming the crest of the tapered male thread part is an arc, an elliptical arc or a parabola.

9. The threaded connection for steel pipes according to claim 8, wherein:
at the longitudinal section,
a height in a direction perpendicular to the pipe axis of the load flank of the tapered male thread part is 30% or more to 70% or less of a height of threads of the tapered male thread part, and
a height in a direction perpendicular to the pipe axis of the stabbing flank of the tapered male thread part is 30% or more to 70% or less of the height of the threads of the tapered male thread part.

10. The threaded connection for steel pipes according to claim 9, wherein:
at the longitudinal section,
the roots of the tapered male thread part are connected to the load flanks of the tapered male thread part through first fillet portions being formed in an arc,
the roots of the tapered male thread part are connected to the stabbing flanks of the tapered male thread part through second fillet portions being formed in an arc,
a radius of the first corner portion is 5% or more to 35% or less of the height of the threads,
a radius of the second corner portion is 15% or more to 50% or less of the height of the threads,
a radius of the first fillet portion is 15% or more to 50% or less of the height of the threads, and
a radius of the second fillet portion is 5% or more to 35% or less of the height of the threads.

11. The threaded connection for steel pipes according to claim 1, wherein:
at the longitudinal section,
a height in a direction perpendicular to the pipe axis of the load flank of the tapered male thread part is 30% or more to 70% or less of a height of threads of the tapered male thread part, and
a height in a direction perpendicular to the pipe axis of the stabbing flank of the tapered male thread part is 30% or more to 70% or less of the height of the threads of the tapered male thread part.

12. The threaded connection for steel pipes according to claim 11, wherein:
at the longitudinal section,
the roots of the tapered male thread part are connected to the load flanks of the tapered male thread part through first fillet portions being formed in an arc,
the roots of the tapered male thread part are connected to the stabbing flanks of the tapered male thread part through second fillet portions being formed in an arc,
a radius of the first corner portion is 5% or more to 35% or less of the height of the threads,
a radius of the second corner portion is 15% or more to 50% or less of the height of the threads,
a radius of the first fillet portion is 15% or more to 50% or less of the height of the threads, and
a radius of the second fillet portion is 5% or more to 35% or less of the height of the threads.

* * * * *